D. C. ALLEN.
Cutter-Heads.

No. 141,744. Patented August 12, 1873.

Attest:
Wm. S. Dewdney
George Taylor

Inventor:
Daniel C. Allen
per D. J. Abbot
Atty

UNITED STATES PATENT OFFICE.

DANIEL C. ALLEN, OF CONCORD, NEW HAMPSHIRE.

IMPROVEMENT IN CUTTER-HEADS.

Specification forming part of Letters Patent No. 141,744, dated August 12, 1873; application filed July 31, 1873.

*To all whom it may concern:*

Be it known that I, DANIEL C. ALLEN, of Concord, in the county of Merrimack and State of New Hampshire, have invented certain new and useful Improvements in Cutter-Heads; and I do hereby declare the following to be a full, clear, and exact description of the invention, such as will enable others skilled in the art to which it pertains to make and use it, reference being had to the accompanying drawings, which form part of this specification.

This invention relates to that class of rotating cutting-tools which are used in the formation of moldings of different shapes; also, for tonguing, grooving, and beading lumber for all the various purposes to which it is applied; one of the principal objects aimed at in this invention being to construct a cutter-head in such a manner that the cutting-tools may be readily and speedily changed for others of a different form, or removed for the purpose of sharpening, and as quickly re-adjusted after such operation is performed, much time being generally taken up by those in common use in accomplishing these objects; and it consists in the construction and arrangement of the different parts, as will be hereinafter more fully set forth.

In the following description similar letters refer to like parts in the different figures.

Figure 1:
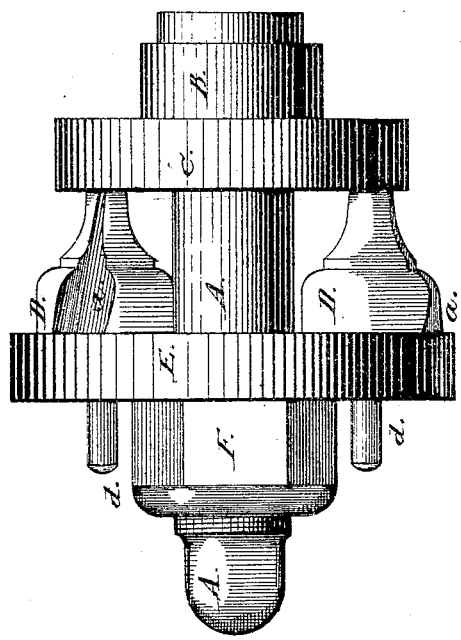
Figure 2:
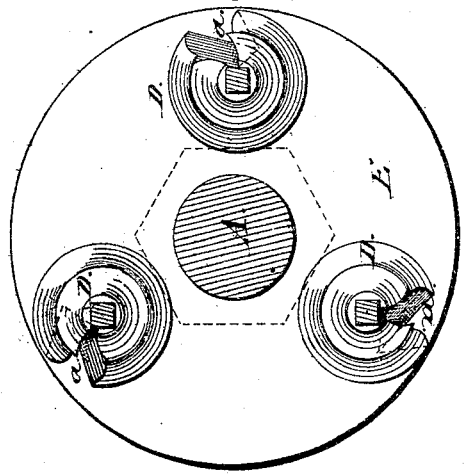

Figure 1 presents a side view of the cutter-head complete. Fig. 2 is a plan of one of the collars, showing the position of the cutters.

A represents a portion of the cutter shaft or spindle, which may be constructed in any desired manner, as its form must be slightly varied to fit it for the different positions of either vertical, horizontal, or any angle between the two in which it is to run, and it is provided with a stationary collar, B, which encircles the arbor and forms a solid bed, upon which rests the removable collar C. This collar forms the bearing for one end of the cutters D, which are formed in the lathe from a solid cylinder of steel, having the contour of the molding or figure they are to cut formed upon their surface, a cross-section of the molding forming a longitudinal section of the cutter. A groove, $a$, of triangular form is then cut at a slight angle to its axis in the tool, one side of the groove being slightly curved and nearly upon a radial line from the center, and the other the tangent of a circle, comprising about one-third of the whole diameter of the cutter. This gives a sharp cutting-edge at the angle where the curved side of the groove meets the circumferential line of the tool—one which is not easily dulled or liable (should the temper be high) to crumbling or breaking. Secured in the collar C, and passing through the cutters D, are formed spindles $d$, which also pass through properly located orifices in the loose collar E, which is fitted so as to move easily upon the spindle A.

When the loose collars C E are in place, with the cutters D between them, their spindles $d$ passing through the holes in the collar E, a nut, F, which acts upon a screw-thread cut upon the end of the spindle A, is turned down, and secures the different parts of the cutter-head firmly together, preventing a partial rotation of the cutters when in the act of cutting, and holding them firmly in whatever position they may have been placed by the operator. The outer edge of the collars may also act as guides to prevent the cutters entering too deeply into the wood, or, by bearing against a pattern, form a ready means of cutting moldings upon curved surfaces.

From its simplicity of construction, and the ease and speed with which its parts are adjusted for the performance of the various kinds of work which cutters of this class are expected to accomplish, this invention it is confidently believed will fill a void which has long been felt by the operators of the many different kinds of molding and tonguing and grooving cutter-heads which have been heretofore presented to the public.

Having thus described my invention, I claim as new, and desire to secure by Letters Patent, the following:

The combination of the adjustable cutters with the holding-collars, nut, and spindle, all the parts being constructed, arranged, and operating as specified.

In testimony that I claim the foregoing I have hereunto set my hand this 28th day of July, 1873.

DANIEL C. ALLEN.

Witnesses:
 WM. H. HALE,
 W. H. KING.